(12) United States Patent
Garcia

(10) Patent No.: US 11,472,750 B2
(45) Date of Patent: Oct. 18, 2022

(54) BARRIER COATING RESIN FORMULATIONS, AND RELATED METHODS

(71) Applicant: Northrop Grumman Systems Corporation, Falls Church, VA (US)

(72) Inventor: Benjamin W. C. Garcia, Tremonton, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 878 days.

(21) Appl. No.: 16/113,257

(22) Filed: Aug. 27, 2018

(65) Prior Publication Data

US 2020/0062663 A1 Feb. 27, 2020

(51) Int. Cl.
*C04B 35/48* (2006.01)
*C04B 41/85* (2006.01)
*C04B 35/565* (2006.01)
*C04B 35/622* (2006.01)
*C04B 41/00* (2006.01)
(Continued)

(52) U.S. Cl.
CPC ............. *C04B 41/85* (2013.01); *C04B 35/48* (2013.01); *C04B 35/565* (2013.01); *C04B 35/62222* (2013.01); *C04B 41/009* (2013.01); *C04B 41/5042* (2013.01); *C04B 41/5059* (2013.01); *C04B 41/87* (2013.01); *F02K 9/974* (2013.01); *C04B 2235/3244* (2013.01); *C04B 2235/3418* (2013.01); *C04B 2235/3813* (2013.01); *C04B 2235/3826* (2013.01);
(Continued)

(58) Field of Classification Search
CPC ............ C04B 35/565; C04B 35/62222; C04B 41/5059; C04B 2235/3418; C04B 2235/3813; C04B 2235/3826; C04B 2235/428; C04B 2235/483
See application file for complete search history.

(56) References Cited

U.S. PATENT DOCUMENTS 4,105,455 A  8/1978  Koga et al.
4,220,600 A  9/1980  Hasegawa et al.
(Continued)

FOREIGN PATENT DOCUMENTS

DE   102011055285 B3   2/2013
EP       0718254 A2   6/1996
(Continued)

OTHER PUBLICATIONS

Database WPI Week 199220 Thomson Scientific, London, GB; AN 1992-162725 XP002797265.
(Continued)

*Primary Examiner* — Noah S Wiese
(74) *Attorney, Agent, or Firm* — TraskBritt

(57) ABSTRACT

A barrier coating resin formulation comprising at least one polycarbosilane preceramic polymer, at least one organically modified silicon dioxide preceramic polymer, at least one filler, and at least one solvent. A barrier coating comprising a reaction product of the at least one polycarbosilane preceramic polymer and the at least one organically modified silicon dioxide preceramic polymer and the at least one filler is also disclosed, as are articles comprising the barrier coating, rocket motors comprising the barrier coating, and methods of forming the articles.

15 Claims, 3 Drawing Sheets

(51) Int. Cl.
*C04B 41/50* (2006.01)
*C04B 41/87* (2006.01)
*F02K 9/97* (2006.01)

(52) U.S. Cl.
CPC .............. *C04B 2235/428* (2013.01); *C04B 2235/483* (2013.01); *C04B 2235/9669* (2013.01)

(56) References Cited

U.S. PATENT DOCUMENTS

| | | | |
|---|---|---|---|
| 4,248,814 A | | 2/1981 | Yajima et al. |
| 4,414,403 A | | 11/1983 | Schilling et al. |
| 4,681,860 A | * | 7/1987 | Bujalski ............... C04B 35/571 501/88 |
| 4,719,273 A | | 1/1988 | Seyferth et al. |
| 4,737,552 A | | 4/1988 | Baney et al. |
| 5,082,872 A | | 1/1992 | Burns et al. |
| 5,334,414 A | | 8/1994 | Edie et al. |
| 5,356,499 A | | 10/1994 | Decker et al. |
| 5,780,126 A | | 7/1998 | Smith et al. |
| 5,872,070 A | | 2/1999 | Dismukes et al. |
| 6,013,711 A | | 1/2000 | Lewis et al. |
| 6,365,698 B1 | | 4/2002 | Goldslager et al. |
| 7,628,878 B2 | | 12/2009 | Riedell et al. |
| 8,466,076 B2 | | 6/2013 | Ruedinger et al. |
| 8,492,476 B2 | | 7/2013 | Monden |
| 8,604,149 B2 | | 12/2013 | Clade et al. |
| 8,658,755 B2 | * | 2/2014 | Saito .................... C08G 77/12 528/37 |
| 8,919,254 B2 | | 12/2014 | Diehl et al. |
| 9,102,571 B2 | | 8/2015 | Szweda et al. |
| 9,412,970 B2 | | 8/2016 | Han et al. |
| 10,875,813 B2 | | 12/2020 | Garcia et al. |
| 2006/0177686 A1 | | 8/2006 | Henager et al. |
| 2009/0252971 A1 | | 10/2009 | Saha et al. |
| 2009/0324930 A1 | | 12/2009 | Tulyani et al. |
| 2010/0015396 A1 | | 1/2010 | Johnson et al. |
| 2010/0255289 A1 | | 10/2010 | Lewinsohn et al. |
| 2011/0098420 A1 | | 4/2011 | Takizawa et al. |
| 2011/0210344 A1 | | 9/2011 | Han et al. |
| 2011/0318549 A1 | | 12/2011 | Schmidt et al. |
| 2012/0065294 A1 | | 3/2012 | Gajiwala et al. |
| 2014/0255635 A1 | | 9/2014 | Morgan et al. |
| 2014/0356613 A1 | | 12/2014 | Weisenberger et al. |
| 2015/0284289 A1 | | 10/2015 | Gu et al. |
| 2016/0153288 A1 | | 6/2016 | Luthra |
| 2016/0160664 A1 | | 6/2016 | Luthra et al. |
| 2016/0207781 A1 | * | 7/2016 | Dukes .................. C01B 32/907 |
| 2017/0144329 A1 | | 5/2017 | Dunn et al. |
| 2019/0016892 A1 | | 1/2019 | Garcia |
| 2020/0032061 A1 | | 1/2020 | Garcia et al. |

FOREIGN PATENT DOCUMENTS

| | | | | |
|---|---|---|---|---|
| EP | 3260434 A1 | | 12/2017 | |
| JP | 04-100875 A | | 4/1992 | |
| JP | H04100875 A | * | 4/1992 | ........... C09D 183/00 |

OTHER PUBLICATIONS

International Search Report for International Application No. PCT/US19/48080, dated Feb. 10, 2020, 5 pages.
International Written Opinion for International Application No. PCT/US19/48080, dated Feb. 10, 2020, 10 pages.
U.S. Appl. No. 15/651,970 entitled, "Preceramic Resin Formulations, Ceramic Materials Comprising the Preceramic Resin Formulations, and Related Articles and Methods", filed Jul. 17, 2017.
U.S. Appl. No. 15/819,658 entitled, "Preceramic Resin Formulations, Impregnated Fibers Comprising the Preceramic Resin Formulations, Composite Materials, and Related Methods", filed Nov. 21, 2017.
Matech "Introducing Pre-ceramic Polymers", Distribution A: Approved for Public Release; Distribution is unlimited, 2 pages http://matechgsm.com/brochures/PolymerPamphlet.pdf, accessed Jun. 8, 2017.
EEMS, LLC, "CSO family of Carbosiloxane Polymers" product listing, 2 pages, eems-llc.com, accessed Jun. 8, 2017.
EEMS, LLC "Liquid Polymers" Product Chart, 1 page, eems-llc.com/wp-content/.../Custom_Polycarbosiloxanes_and_Polycarbosilanes.pdf, accessed Jun. 8, 2017.
StarPCS™ SMP-10, "Silicon Carbide Matrix Precursor" Technical Data, http://www.starfiresystems.com/docs/ceramic-forming-polymers/SMP-10.pdf, accessed Jun. 8, 2017.

* cited by examiner

BARRIER COATING RESIN FORMULATIONS, AND RELATED METHODS

STATEMENT REGARDING FEDERALLY SPONSORED RESEARCH OR DEVELOPMENT

This invention was made with government support under Contract Number FA8811-16-9-0002 awarded by the United States Department of Defense (Air Force). The government has certain rights in the invention.

CROSS-REFERENCE TO RELATED APPLICATIONS

This application is related to U.S. patent application Ser. No. 15/651,970, entitled "PRECERAMIC RESIN FORMULATIONS, CERAMIC MATERIALS COMPRISING THE PRECERAMIC RESIN FORMULATIONS, AND RELATED ARTICLES AND METHODS," filed Jul. 17, 2017, now U.S. Pat. No. 10,731,036, issued on Aug. 4, 2020, and to U.S. patent application Ser. No. 15/819,658, entitled "PRECERAMIC RESIN FORMULATIONS, IMPREGNATED FIBERS COMPRISING THE PRECERAMIC RESIN FORMULATIONS, COMPOSITE MATERIALS, AND RELATED METHODS," filed Nov. 21, 2017, now U.S. Pat. No. 10,875,813, issued on Dec. 29, 2020, the disclosure of each of which application is incorporated by reference herein in its entirety.

TECHNICAL FIELD

Embodiments of the disclosure relate generally to barrier coating resin formulations that are resistant to heat, moisture, and oxidation. More particularly, embodiments of the disclosure relate to barrier coating resin formulations that include at least one polycarbosilane preceramic polymer, at least one organically modified silicon dioxide preceramic polymer, at least one filler, and at least one solvent, barrier coatings including a reaction product of the at least one polycarbosilane preceramic polymer and the at least one organically modified silicon dioxide preceramic polymer, articles including the barrier coating, rocket motors including the barrier coating, and related methods.

BACKGROUND

Barrier coatings, such as environmental barrier coatings (EBCs), are used to protect silicon-based materials, such as silicon-based ceramic materials, from high temperatures, moisture, and oxidation. The EBC is placed on locations of the silicon-based ceramic material that are exposed to high temperatures and pressures, such as high pressure, high temperature fluids including high temperature, high pressure water. The EBC prevents the reaction of water and other reactive species with the silicon, which can form reaction products (e.g., silicon hydroxide) that volatilize and cause erosion of the silicon-based ceramic material. Conventional barrier coatings have been formed of silicates, such as barium-strontium-aluminosilicates, other alkaline earth aluminosilicates, or lutetium silicates, yttria-stabilized zirconia (YSZ), etc., which are expensive materials. Multi-layer barrier coatings have also been used, with each layer providing a different function or functions, such as an adhesion (e.g., bond) layer, an oxygen barrier layer, a temperature resistant layer, etc.

Silicon carbide (SiC) and other silicon-based ceramic materials are used to produce ceramic matrix composites (CMCs) having high structural and mechanical strength at a temperature above 1200° C. (2200° F.). The CMCs are commonly used in aerospace and other industries where resistance to heat (e.g., high temperatures) is desired. Conventional barrier coatings are applied by plasma spray processes, such as atmospheric plasma spray (APS) processes, that utilize specialized equipment in a vacuum environment. Multiple layers of the barrier coating are typically needed to protect the CMCs. Forming the barrier coatings are, therefore, expensive and time consuming. In addition, these barrier coatings are not able to withstand temperatures above 1482° C. (2700° F.). Therefore, even with the barrier coating, the CMCs may decompose when exposed to high temperature water.

BRIEF SUMMARY

In accordance with some embodiments described herein, a barrier coating resin formulation is disclosed. The barrier coating resin formulation comprises at least one polycarbosilane preceramic polymer, at least one organically modified silicon dioxide preceramic polymer, at least one filler, and at least one solvent.

In accordance with other embodiments, a barrier coating is disclosed and comprises a reaction product of at least one polycarbosilane preceramic precursor and at least one organically modified silicon dioxide preceramic polymer. At least one filler is in the reaction product and comprises from about 30 volume percent to about 90 volume percent of the barrier coating.

In additional embodiments, an article is disclosed. The article comprises a silicon-based ceramic material and a barrier coating on the silicon-based ceramic material. The barrier coating comprises a reaction product of at least one polycarbosilane preceramic precursor and at least one organically modified silicon dioxide preceramic polymer, and at least one filler.

In accordance with other embodiments, a rocket motor is disclosed. The rocket motor comprises a casing and a nozzle secured to the casing, at least a portion of the nozzle comprising a barrier coating comprising a reaction product of at least one polycarbosilane preceramic precursor and at least one organically modified silicon dioxide preceramic polymer and at least one filler.

In accordance with other embodiments, a method of forming an article is disclosed. The method comprises applying a barrier coating resin formulation to a substrate and curing the barrier coating resin formulation to form a cured barrier coating. The barrier coating resin formulation comprises at least one polycarbosilane preceramic polymer, at least one organically modified silicon dioxide preceramic polymer, at least one filler, and at least one solvent.

DETAILED DESCRIPTION

Figure 1:
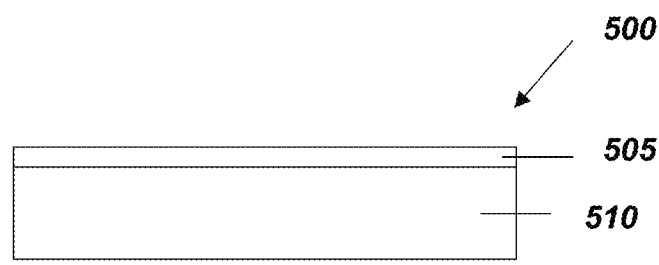
FIG. 1 is a simplified cross-sectional view of an article including a barrier coating in accordance with embodiments of the disclosure, the barrier coating formed on a substrate.

Barrier coating resin formulations comprising at least one silicon carbide precursor resin, at least one silicon dioxide precursor resin, at least one filler, and at least one solvent are disclosed, as are barrier coatings (e.g., environmental barrier coatings), articles comprising the barrier coating, and methods of forming the articles. The filler constitutes a majority of the barrier coating resin formulation relative to the silicon carbide precursor resin and silicon dioxide precursor resin, providing the articles with increased resistance to heat, moisture, and oxidation. The barrier coating resin formulation may also include at least one catalyst. The barrier coating resin formulation is applied to a substrate and cured (e.g., crosslinked) to form a cured barrier coating over the substrate. The cured barrier coating may be ceramified to form a ceramified barrier coating over the substrate. The barrier coating resin formulation is applied to the substrate by a spray coating process that is conducted under ambient conditions, enabling the barrier coating to be formed using a low complexity, low cost process. The barrier coating may be utilized on any substrate in which protection from heat, moisture, and oxidation at a temperature of greater than or equal to about 2000° F. (about 1093° C.) is desired, such as between about 2000° F. (about 1093° C.) and about 5000° F. (about 2760° C.). The barrier coating according to embodiments of the disclosure provides a high temperature capability and low mass loss to the article having the barrier coating incorporated therein compared to an uncoated article or to an article having a conventional barrier coating. Since the barrier coating may be formed on the substrate by a low cost process, the cost of fabricating the article including the barrier coating is low since the article may be formed without utilizing specialized equipment or facilities.

As used herein, the singular forms "a," "an," and "the" are intended to include the plural forms as well, unless the context clearly indicates otherwise.

As used herein, the term "about" or "approximately" in reference to a numerical value for a given parameter is inclusive of the numerical value and has the meaning dictated by the context (e.g., it includes the degree of error associated with measurement of the given parameter). For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "and/or" includes any and all combinations of one or more of the associated listed items.

As used herein, the term "barrier coating resin formulation" means and includes a formulation including the silicon carbide precursor resin (e.g., a polycarbosilane preceramic polymer), the silicon dioxide precursor resin (e.g., an organically modified silicon dioxide preceramic polymer), the filler, and the solvent before cure and ceramification of the barrier coating resin formulation.

As used herein, the term "barrier coating" or "environmental barrier coating" means and includes a reaction product of the silicon carbide precursor resin and silicon dioxide precursor resin and is used to refer generally to the reaction product whether cured or cured and ceramified.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped, etc.) and the spatially relative descriptors used herein interpreted accordingly.

As used herein, the term "ceramic yield" means and includes a residual mass of the reaction product of the silicon carbide precursor resin and silicon dioxide precursor resin remaining after cure at from about 0° C. to about 400° C. and/or ceramification of the barrier coating resin formulation at a temperature of about 1200° C. or greater.

As used herein, the term "ceramified barrier coating" means and includes a reaction product of the silicon carbide precursor resin and silicon dioxide precursor resin following cure and ceramification of the barrier coating resin formulation.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "configured" refers to a size, shape, material composition, and arrangement of one or more of at least one structure and at least one apparatus facilitating operation of one or more of the structure and the apparatus in a pre-determined way.

As used herein, the term "cured barrier coating" means and includes a reaction product of the silicon carbide precursor resin and silicon dioxide precursor resin following cure of the barrier coating resin formulation and before ceramification of the barrier coating resin formulation.

As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

As used herein, the term "preceramic" means and includes a polymer material that is converted to a ceramic material when heated to a temperature of greater than about 649° C. (greater than about 1200° F.).

As used herein, the term "substantially," in reference to a given parameter, property, or condition, means to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "substrate" refers to a silicon-based ceramic material, a carbon-carbon material, a ceramic matrix composite (CMC), or a metal material. The silicon-based ceramic material may be a silicon carbide material, a silicon nitride material, a silicon oxynitride material, a metal silicide, or a combination thereof and may be monolithic. The CMC may include a matrix material and a reinforcement material, with the matrix material including a ceramic material or a ceramic material and a metal or a metalloid. By way of example only, the substrate may be a silicon-based ceramic material, a CMC, or a metal material configured for use in the aerospace industry, automotive industry, or aviation industry, or other industry where substrates resistant to heat, moisture, and oxidation are used.

The following description provides specific details, such as materials, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow for manufacturing the article from the barrier coating resin formulation. Only those process acts and structures necessary to understand the embodiments of the disclosure are described in detail below. Additional acts to form the article from the barrier coating resin formulation may be performed by conventional techniques. Also note, any drawings accompanying the application are for illustrative purposes only, and are thus not drawn to scale. Additionally, elements common between figures may retain the same numerical designation.

The barrier coating resin formulation includes the at least one silicon carbide precursor resin, the at least one silicon dioxide precursor resin, the at least one filler, and the at least one solvent. The barrier coating resin formulation is formulated to exhibit a viscosity at room temperature that is suitable (e.g., formulated) for applying the barrier coating resin formulation by spray coating, such as by air assisted spray coating or by airless spray coating. The barrier coating formed from the barrier coating resin formulation may exhibit desired material properties (e.g., rheological properties, mechanical properties, physical properties, chemical properties, thermal properties), such as resistance to heat, moisture, and oxidation at temperatures between about 2000° F. (about 1093° C.) and about 5000° F. (about 2760° C.).

To apply the barrier coating resin formulation by spray coating, the barrier coating resin formulation may be formulated to exhibit a viscosity of less than or equal to about 20,000 cP at a temperature of about 25° C., such as less than or equal to about 10,000 cP at a temperature of about 25° C., such as less than or equal to about 5,000 cP at a temperature of about 25° C., less than or equal to about 2,000 cP at a temperature of about 25° C., less than or equal to about 1,000 cP at a temperature of about 25° C., less than or equal to about 500 cP at a temperature of about 25° C., less than or equal to about 300 cP at a temperature of about 25° C., less than or equal to about 200 cP at a temperature of about 25° C., less than or equal to about 150 cP at a temperature of about 25° C., or less than or equal to about 100 cP at a temperature of about 25° C. By way of example only, the viscosity of the barrier coating resin formulation may be between about 50 cP and about 150 cP at a temperature of about 25° C. In some embodiments, the barrier coating resin formulation is formulated to exhibit a viscosity of less than or equal to about 100 cP at a temperature of about 25° C. The viscosities of the silicon carbide precursor resin and silicon dioxide precursor resin at least partially contribute to the overall viscosity of the barrier coating resin formulation, with the filler and the solvent also contributing to the viscosity.

The silicon carbide precursor resin may have a viscosity of less than or equal to about 250 cP at a temperature of about 25° C. The silicon carbide precursor resin is a polycarbosilane preceramic polymer formed of monomers having the following chemical structure:

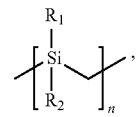

where $R_1$ and $R_2$ of each monomer is independently a hydrogen (H) group, a methyl ($CH_3$) group, or a vinyl group ($CH_2=CH$) and n is an integer from 2 to 10,000 (e.g., from 100 to 5,000). When vinyl groups are present, the vinyl group may be directly bonded to the silicon atom or may be bonded to the silicon atom by an alkyl group or other linker. By way of example only, the alkyl group may include from one carbon atom to six carbon atoms. At least a portion of the monomers in the polycarbosilane preceramic polymer include the vinyl group as $R_1$ or $R_2$ to enable crosslinking with the organically modified silicon dioxide preceramic polymer during cure of the barrier coating resin formulation. The amount of vinyl groups in the polycarbosilane preceramic polymer may be sufficient to crosslink the barrier coating resin formulation. The polycarbosilane preceramic polymer may include at least about 0.01 vinyl eq/kg, such as from about 0.2 vinyl eq/kg to about 5.0 vinyl eq/kg. The polycarbosilane preceramic polymer may also include at least about 0.01 hydride eq/kg, such as from about 0.2 hydride eq/kg to about 10 hydride eq/kg. The polycarbosilane preceramic polymer may be photocurable, chemically curable, or thermally curable.

By selecting the $R_1$ and $R_2$ groups of each monomer and the degree of polymerization (i.e., the number of monomer repeat units), a desired viscosity of the polycarbosilane preceramic polymer may be achieved. The polycarbosilane preceramic polymer is formulated to exhibit a viscosity of less than or equal to about 250 cP at a temperature of about 25° C., such as from about 1 cP to about 250 cP at about 25° C., from about 1 cP to about 200 cP at about 25° C., from about 1 cP to about 100 cP at about 25° C., from about 10 cP to about 250 cP at about 25° C., from about 10 cP to about 200 cP at about 25° C., from about 40 cP to about 250 cP at about 25° C., from about 40 cP to about 200 cP at about 25° C., from about 40 cP to about 120 cP at about 25° C., from about 40 cP to about 100 cP at about 25° C., from about 5 cP to 8 cP at about 25° C., from about 4 cP to about 7 cP at about 25° C., from about 8 cP to about 12 cP at about 25° C., from about 8 cP to about 15 cP at about 25° C., or from about 200 cP to about 250 cP at about 25° C. In some embodiments, the polycarbosilane preceramic polymer has a viscosity of from about 40 cP to about 120 cP at about 25° C.

Such polycarbosilane preceramic polymers are commercially available from numerous sources including, but not limited to, EEMS, LLC (Saratoga Springs, N.Y.), Starfire Systems, Inc. (Schenectady, N.Y.), or Matech (Westlake Village, Calif.). The polycarbosilane preceramic polymer may include, but is not limited to, SMP-10, STARPCS® SMP-500, or STARPCS® SMP-877 silicon carbide precursor resin from Starfire Systems, Inc. (Malta, N.Y.). Additional polycarbosilane preceramic polymers are commercially available from EEMS, LLC as MS 208, MS 272, MS 250, MS 440, CSO 110, or CSO 116. The polycarbosilane preceramic polymer may also include a combination of polycarbosilane preceramic polymers or a combination of the polycarbosilane preceramic polymer with at least one other polymer, such as a polysiloxane or other compatible polymer. The polycarbosilane preceramic polymer may be available at a relatively low cost, such as less than about $100/pound. Commercially available polycarbosilane preceramic polymers may also include a combination of the polycarbosilane preceramic polymer.

The silicon dioxide precursor resin may have a viscosity of greater than or equal to about 2,500 cP at a temperature of about 25° C. The silicon dioxide precursor resin is an organically modified silicon dioxide preceramic polymer formed of monomers having the following chemical structure:

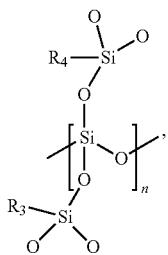

where each of $R_3$ and $R_4$ is independently a methyl ($CH_3$) group or a vinyl group ($CH_2$=$CH$) and n is an integer from 2 to 10,000 (e.g., from 100 to 5,000). When vinyl groups are present, the vinyl group may be directly bonded to the silicon atom or may be bonded to the silicon atom by an alkyl group or other linker. By way of example only, the alkyl group may include from one carbon atom to six carbon atoms. The organically modified silicon dioxide preceramic polymer includes a quaternary coordinated (QC) oxygen to silicon atom and may also be referred to as a QC silicon dioxide preceramic polymer. At least a portion of the monomers in the organically modified silicon dioxide preceramic polymer may, optionally, include the vinyl group as $R_3$ or $R_4$ to enable crosslinking with the polycarbosilane preceramic polymer during cure of the barrier coating resin formulation. The organically modified silicon dioxide preceramic polymer may include from about 0 vinyl eq/kg to about 5.0 vinyl eq/kg, such as from about 0.18 vinyl eq/kg to about 0.3 vinyl eq/kg. The organically modified silicon dioxide preceramic polymer may be photocurable, chemically curable, or thermally curable.

$R_3$ and $R_4$ of each monomer of the organically modified silicon dioxide preceramic polymer and the degree of polymerization are selected to provide the desired viscosity to the organically modified silicon dioxide preceramic polymer. The organically modified silicon dioxide preceramic polymer also has a low carbon content and a high degree of quaternary coordinated oxygen to the silicon atoms in the polymer chain. The organically modified silicon dioxide preceramic polymer is formulated to exhibit a viscosity greater than about 200 cP at a temperature of about 25° C., such as greater than about 2,500 cP at a temperature of about 25° C., from about 3,000 cP to about 100,000 cP at about 25° C., from about 4,000 cP to about 100,000 cP at about 25° C., from about 5,000 cP to about 100,000 cP at about 25° C., from about 6,000 cP to about 100,000 cP at about 25° C., from about 4,500 cP to about 7,000 cP at about 25° C., from about 40,000 cP to about 80,000 cP at about 25° C., from about 45,000 cP to about 75,000 cP at about 25° C., from about 50,000 cP to about 70,000 cP at about 25° C., or from about 50,000 cP to about 60,000 cP at about 25° C. In some embodiments, the organically modified silicon dioxide preceramic polymer has a viscosity of from about 50,000 cP to about 60,000 cP at a temperature of about 25° C. In other embodiments, the organically modified silicon dioxide preceramic polymer has a viscosity of from about 4,500 cP to about 7,000 cP at about 25° C.

Such organically modified silicon dioxide preceramic polymers are commercially available from numerous sources including, but not limited to, Gelest, Inc. (Morrisville, Pa.). The organically modified silicon dioxide preceramic polymer may include, but is not limited to, VQM 135, VQM 135R, VQM 146, HQM 105, HQM 107, or combinations thereof.

Relative amounts of the polycarbosilane preceramic polymer and the organically modified silicon dioxide preceramic polymer may be adjusted to tailor the mechanical properties and performance properties of the barrier coating. The barrier coating resin formulation may include from about 10% by weight (wt %) to about 90 wt % of the polycarbosilane preceramic polymer and from about 10 wt % to about 90 wt % of the organically modified silicon dioxide preceramic polymer, such as from about 20 wt % to about 80 wt % of the polycarbosilane preceramic polymer and from about 20 wt % to about 80 wt % of the organically modified silicon dioxide preceramic polymer. In some embodiments, the barrier coating resin formulation includes 80 wt % of the polycarbosilane preceramic polymer and 20 wt % of the organically modified silicon dioxide preceramic polymer.

The filler in the barrier coating resin formulation may be a ceramic material that is resistant to temperatures to which the barrier coating is exposed during use and operation of the article including the barrier coating. The filler may have a melting point of between about 1,800° C. and about 4,000° C., such as between about 2,000° C. and about 3,900° C. The filler is also thermally stable at a temperature above about 2000° F. (about 1093° C.) and does not degrade at processing temperatures. The filler also exhibits a low density, minimizing the overall mass of the barrier coating. The density of the filler may be between 1.8 g/ml and 13.0 g/ml, such as between about 2.0 g/ml and about 12.5 g/ml, or between about 2.1 g/ml and about 12.2 g/ml. The filler also exhibits a low effect on the viscosity of the barrier coating resin formulation, even at high filler loading.

The filler may include, but is not limited to, silicon carbide, hafnium carbide, tantalum carbide, niobium carbide, zirconium carbide, tungsten carbide, molybdenum carbide, zirconium oxide, aluminum oxide, hafnium oxide, magnesium oxide, thorium oxide, boron nitride, hafnium nitride, tantalum nitride, zirconium nitride, titanium nitride, titanium diboride, hafnium diboride, tantalum diboride, zirconium diboride, tungsten boride, or combinations thereof. The filler is commercially available from various sources, such as Momentive Performance Materials Inc. (Waterford, N.Y.) or Panadyne Inc. (Montgomeryville, Pa.). In some embodiments, the filler includes zirconium oxide and titanium diboride. In other embodiments, the filler includes zirconium oxide, titanium diboride, and silicon carbide. In yet other embodiments, the filler includes silicon carbide.

Alternatively or in addition to, the filler may be a density, thermal conductivity, or ablation aid filler. The filler may include, but is not limited to, hollow glass microspheres, hollow polymeric microspheres, hollow ceramic microspheres, hollow polymeric fibers, hollow glass fibers, other hollow fibers, or combinations thereof. The fibers may include, but are not limited to, glass fibers, ceramic fibers, carbon fibers, KEVLAR® fibers, metal fibers, or combinations thereof. The fiber filler may include chopped fibers, such as chopped carbon fibers; chopped glass fiber, chopped aramid fibers, or combinations thereof. Such fillers are commercially available from numerous sources, such as from 3M (Maplewood, Minn.).

At high temperatures, such as above about 3000° F. or between about 3000° F. and 5000° F., the filler may be present and selected to enable a high filler loading while having a minimal effect on the viscosity of the barrier coating resin formulation, a minimal effect on mechanical properties of the barrier coating, and a minimal mass loss of the barrier coating. In high temperature environments, the filler may have a melting point of greater than about 3000° F. In general, as the amount of filler in the barrier coating resin formulation increases, the viscosity of the barrier coating resin formulation increases. Therefore, the amount of filler used in the barrier coating resin formulation is a balance between achieving high filler loading and the desired viscosity of the barrier coating resin formulation. The filler may be present in the barrier coating resin formulation at up to about 90 volume percent (vol %), such as from about 1 volume percent to about 90 volume percent, from about 5 volume percent to about 80 volume percent, from about 10 volume percent to about 80 volume percent, from about 20 volume percent to about 80 volume percent, from about 30 volume percent to about 80 volume percent, from about 30 volume percent to about 70 volume percent, from about 30 volume percent to about 60 volume percent, from about 30 volume percent to about 50 volume percent, from about 30 volume percent to about 40 volume percent, from about 40 volume percent to about 80 volume percent, from about 40 volume percent to about 70 volume percent, from about 40 volume percent to about 60 volume percent, or from about 40 volume percent to about 50 volume percent. Any increased viscosity contributed by the filler may be counteracted by increasing the amount of solvent present in the barrier coating resin formulation.

The filler loading of the barrier coating resin formulation enables the barrier coating to be resistant to a temperature between about 2000° F. (about 1093° C.) and about 5000° F. (about 2760° C.). If the article is to be used at a temperature between about 3000° F. and about 5000° F., the filler loading may be at the upper end of the range mentioned above. If the article is to be used at a temperature between about 2000° F. and about 3000° F., the filler loading may be at the lower end or middle end of the range mentioned above. If the article is to be used at a temperature below about 2000° F., no filler may be utilized in the barrier coating resin formulation or a lower amount of the filler may be sufficient to provide the desired properties. In other words, the filler may be optional if the barrier coating is to be used in a low temperature (e.g., below about 1093° C. (about 2000° F.) or below about 1649° C. (about 3000° F.)) environment. By way of example only, if the article is to be used at a temperature below about 3000° F., the filler may be present at from about 1 volume percent to about 50 volume percent. If the article is to be used at a temperature above about 3000° F., the filler may be present at from about 30 volume percent to about 90 volume percent.

Particle size of the filler may also affect the viscosity and filler loading of the barrier coating resin formulation. The filler may have an average mean diameter of from about 0.1 µm to about 150 µm, such as from about 0.1 µm to about 50 µm, from about 0.1 µm to about 40 µm, from about 0.1 µm to about 30 µm, from about 0.1 µm to about 20 µm, from about 0.1 µm to about 10 µm, from about 0.1 µm to about 5 µm, from about 0.5 µm to about 40 µm, from about 0.5 µm to about 30 µm, from about 0.5 µm to about 20 µm, from about 0.5 µm to about 10 µm, from about 0.5 µm to about 5 µm, from about 0.5 µm to about 1 µm, from about 1 µm to about 50 µm, from about 1 µm to about 40 µm, from about 1 µm to about 30 µm, from about 1 µm to about 20 µm, from about 1 µm to about 10 µm, from about 2 µm to about 8 µm, or from about 2 µm to about 5 µm. To achieve a desired balance between the viscosity and filler loading, the filler may be present in two or more particle sizes or particle size ranges, where the particle sizes are selected to improve packing efficiency and loading of the filler in the barrier coating resin formulation. For instance, a small particle size filler may have an average mean diameter of less than about 1.0 µm and a large particle size filler may have an average mean diameter of from about 1.5 µm to about 5 µm. In some embodiments, the small particle size filler has an average mean diameter of from about 0.5 µm to about 0.6 µm and the large particle size filler has an average mean diameter of from about 2 µm to about 5 µm. The filler may also include two or more fillers, with each filler having a different particle size or particle size range. If, for example, two fillers are used, the two fillers may be present at a ratio of 1:1, 1:2, 1:3, 1:4, 2:1, 3:1, or 4:1. In some embodiments, the two fillers are present at a ratio of 2:1. The amount of small particle size filler present in the barrier coating resin formulation may be limited by the effect on viscosity, which increases at higher filler loading. Using the large particle size filler may enable a higher filler loading with a smaller effect on the viscosity of the barrier coating resin formulation. By using the different particle size fillers, a desired amount of filler may be present in the barrier coating resin formulation without negatively affecting its viscosity.

In some embodiments, zirconium oxide and titanium diboride are used as fillers in the barrier coating resin formulation. The zirconium oxide is present at an average mean diameter of about 0.6 µm and the titanium diboride is present at an average mean diameter of about 3 µm and the ratio of zirconium oxide:titanium diboride is 2:1. The zirconium oxide and titanium diboride are present at 65 wt % with respect to the polycarbosilane preceramic polymer and the organically modified silicon dioxide preceramic polymer.

The solvent functions as a carrier fluid and may be present in an amount sufficient to formulate the barrier coating resin formulation at the desired viscosity (i.e., the viscosity suitable for spray coating), enabling the barrier coating resin formulation to be applied to the substrate at a low temperature and low pressure, such as at ambient conditions. The solvent may also be volatile. The solvent is selected to provide solubility of the polycarbosilane preceramic polymer, the organically modified silicon dioxide preceramic polymer, and the filler in the barrier coating resin formulation, in addition to enabling the high filler loading and the desired viscosity. The solvent may be an aprotic organic solvent including, but not limited to, acetone, acetonitrile (MeCN), benzene, dichloromethane (DCM), dimethylformamide (DMF), dimethylsulfoxide (DMSO), ethyl acetate (EtOAc), hexamethylphosphoramide (HMPA), methyl ethyl ketone (MEK), tetrahydrofuran (THF), toluene, xylene, or combinations thereof. The solvent may also include the aprotic organic solvent in combination with an alcohol, such as methanol, ethanol, propanol, or a combination thereof.

The barrier coating resin formulation may include a solids content of from about 1 wt % to about 20 wt % solids, such as from about 5 wt % to about 20 wt % solids, from about 10 wt % to about 20 wt % solids, or from about 15 wt % to about 20 wt % solids, with the solvent, the silicon carbide precursor resin, and the silicon dioxide precursor resin accounting for the remainder of the barrier coating resin formulation. By way of example only, the barrier coating resin formulation may be a 10 wt % solids coating solution. The solids content may be adjusted to achieve the desired viscosity of the barrier coating resin formulation. By way of example only, if the barrier coating resin formulation is to be applied by a HVLP spray process, the solids content may be adjusted so that the viscosity is below about 500 cP at a temperature of about 25° C. If the barrier coating resin formulation is to be applied by an airless spray process, the solids content may be adjusted so that the viscosity is below about 20,000 cP at a temperature of about 25° C.

The barrier coating resin formulation may also include a crosslinking agent, such as a radical initiator, a cationic initiator, or a catalyst, such as a hydrosilylation catalyst. The crosslinking agent initiates crosslinking of the polycarbosilane preceramic polymer and the organically modified silicon dioxide preceramic polymer by reacting the vinyl groups with silicon-hydrogen groups in the barrier coating resin formulation. The radical initiator may be a peroxide compound or an azo compound used to cure (e.g., crosslink) the polycarbosilane preceramic polymer and the organically modified silicon dioxide preceramic polymer. The peroxide compound may include, but is not limited to, benzoyl peroxide, dicumyl peroxide, bis-(2,4-dichlorobenzoyl)-peroxide, or combinations thereof. The azo compound may include, but is not limited to, azobisisobutyronitrile. The cationic initiator may include a protonic acid, a Lewis acid/Friedel-Crafts catalyst (e.g., $SnCl_4$, $AlCl_3$, $BF_3$, and $TiCl_4$), carbenium ion salts (e.g., with trityl or tropylium cations), or through ionizing radiation. The hydrosilylation catalyst may be a transition metal catalyst, such as platinum, rhodium, ruthenium iridium, palladium, nickel, cobalt, iron, manganese, or combinations thereof. In some embodiments, the crosslinking agent is a platinum catalyst and HQM 105 or HQM 107 is used as the crosslinking agent. The crosslinking agent may be present at an amount sufficient to react (e.g., crosslink) the polycarbosilane preceramic polymer and organically modified silicon dioxide preceramic polymer and selection of the crosslinking agent at least partially depends on the polycarbosilane preceramic polymer and organically modified silicon dioxide preceramic polymer used, as well as on the desired cure time of the barrier coating resin formulation. The crosslinking agent may, for example, be present in the preceramic resin formulation at from about 0.01 parts per hundred parts of resin (phr) to about 10 phr, such as from about 0.5 phr to about 5.0 phr, from about 0.5 phr to about 2.5 phr, or about 1.0 phr.

The barrier coating resin formulation may include optional components (e.g., additives) to provide desirable properties to the barrier coating formed from the barrier coating resin formulation. If present, the additive may be at least one compound that enhances at least one material property (e.g., ceramic yield, extent of cracking) of the barrier coating to be formed from the barrier coating resin formulation. By way of example only, the additive may be a cure accelerator, an adhesion promoter, a lubricant, a filler, a pigment, or combinations thereof. Such additives are known in the art and are not described in detail herein. In some embodiments, the barrier coating resin formulation is substantially free of additives other than the crosslinking agent (e.g., catalyst). Thus, the barrier coating resin formulation consists essentially of or consists of the polycarbosilane preceramic polymer, the organically modified silicon dioxide preceramic polymer, the crosslinking agent, the filler, and the solvent.

In some embodiments, the barrier coating resin formulation includes a 80:20 ratio of the polycarbosilane preceramic polymer to the organically modified silicon dioxide preceramic polymer, the filler at about 65 wt % of the resin (e.g., the polycarbosilane preceramic polymer and the organically modified silicon dioxide preceramic polymer), and about 1.0 phr of the crosslinking agent. The polycarbosilane preceramic polymer and the organically modified silicon dioxide preceramic polymer are blended with the zirconium oxide and titanium diboride at a 4:1 ratio. In some embodiments, the polycarbosilane preceramic polymer is CSO-110 from EEMS, LLC, the organically modified silicon dioxide preceramic polymer is VQM-146 from Gelest, Inc., the filler is zirconium oxide and titanium diboride, the crosslinking agent is a platinum catalyst, and the solvent is toluene.

The barrier coating resin formulation may be formed by mixing the polycarbosilane preceramic polymer, the organically modified silicon dioxide preceramic polymer, the filler, the catalyst if present, and the solvent, along with any optional additives. The polycarbosilane preceramic polymer, organically modified silicon dioxide preceramic polymer, filler, catalyst if present, and solvent may be mixed by conventional techniques, such as by hand, using a high shear mixer, or using a planetary mixer. Mixing the components under vacuum may remove gases from the barrier coating resin formulation, which inhibits the formation of voids or pores during curing. The components may be mixed under inert conditions, such as under argon. The polycarbosilane preceramic polymer, organically modified silicon dioxide preceramic polymer, filler, catalyst if present, and solvent may be mixed for an amount of time sufficient to form a substantially homogeneous barrier coating resin formulation (e.g., the polycarbosilane preceramic polymer, organically modified silicon dioxide preceramic polymer, filler, and catalyst if present may be uniformly dispersed throughout the barrier coating resin formulation), or may be heterogeneous (e.g., at least one of the polycarbosilane preceramic polymer, organically modified silicon dioxide preceramic polymer, filler, and catalyst if present may be non-uniformly dispersed throughout the barrier coating resin formulation). The solvent may be added with the other components to achieve the desired viscosity. In some embodiments, the barrier coating resin formulation is substantially homogeneous as formed. During mixing, the barrier coating resin formulation may be maintained at a temperature below the lowest cure temperature of each of the components. In one embodiment, the polycarbosilane preceramic polymer, organically modified silicon dioxide preceramic polymer, filler, catalyst if present, and solvent are maintained at room temperature (from about 20° C. to about 25° C.) during mixing. A water-cooled jacket may be used, as needed, to maintain the barrier coating resin formulation at or near room temperature to inhibit potential reactions from occurring during the mixing.

If the barrier coating resin formulation is to be applied by an air assisted spray coating technique, the barrier coating resin formulation may exhibit a viscosity within a range of from about 50 cP to about 500 cP at a temperature of about 25° C., such as from about 50 cP to about 150 cP at a temperature of about 25° C., or from about 50 cP to about 100 cP at a temperature of about 25° C. The barrier coating resin formulation also exhibits a room temperature pot life. If the barrier coating resin formulation is to be applied by an airless spray coating technique, the barrier coating resin formulation may exhibit a viscosity within a range of from about 200 cP to about 20,000 cP at a temperature of about 25° C., from about 500 cP to about 20,000 cP at a temperature of about 25° C., or from about 500 cP to about 5,000 cP at a temperature of about 25° C.

The barrier coating resin formulation may be applied to the substrate by spray coating. The spray coating may be conducted at ambient conditions, such as at room temperature (between about 20° C. and about 25° C.) and atmospheric pressure. The spray coating process may be an air assisted spray coating technique or an airless spray coating technique. The spray coating process may be conducted using a conventional spray apparatus, such as a high volume low pressure (HVLP) spray apparatus. The barrier coating resin formulation may be applied as a single application or as multiple applications until a desired thickness of the barrier coating is achieved. Since the barrier coating resin formulation may be applied by spray coating at ambient conditions, the barrier coating resin formulation may be easily and quickly applied to the substrate. In addition, no specialized equipment or building infrastructure is required.

The barrier coating resin formulation may be applied at a thickness of from about 1 μm to about 13,000 μm, such as from about 15 μm to about 3000 μm, from about 20 μm to about 3500 μm, from about 100 μm to about 3500 μm, from about 500 μm to about 3500 μm, from about 1000 μm to about 2000 μm, from about 1000 μm to about 3000 μm, from about 1500 μm to about 3000 μm, or from about 2000 μm to about 3000 μm. The thickness of the barrier coating may depend on the intended application for the barrier coating and the temperature and pressure conditions to which the barrier coating may be subjected. The barrier coating may exhibit a substantially uniform (e.g., homogeneous) composition throughout its thickness.

Once applied, the barrier coating resin formulation may be subjected to one or more heat treatments to form a cured barrier coating on the substrate. The heat treatment may also remove the solvent, which is volatile. If the barrier coating resin formulation is applied in a single application, the heat treatment may be conducted after the barrier coating resin formulation is applied to the desired thickness. If the barrier coating resin formulation is applied by conducting multiple applications, the heat treatment may be conducted between each application or after the last application. The polycarbosilane preceramic polymer and organically modified silicon dioxide preceramic polymer may be reacted (e.g., crosslinked, cured) to form the cured barrier coating as a hardened coating. The cured barrier coating on the substrate may be referred to herein as the article or a coated substrate. The conditions used to cure the barrier coating resin formulation may depend on the polycarbosilane preceramic polymer, organically modified silicon dioxide preceramic polymer, and crosslinking agent (if present) used in the barrier coating resin formulation. The barrier coating resin formulation may be cured by exposure to a temperature with a range from about 0° C. (about 32° F.) to about 400° C. (about 752° F.), such as from about 20° C. (about 68° F.) to about 371° C. (700° F.), from about 121° C. (about 250° F.) to about 371° C. (700° F.), or from about 20° C. (about 68° F.) to about 121° C. (about 250° F.). Depending on the cure temperature used, the barrier coating resin formulation may be cured in an amount of time ranging from a few seconds (e.g., photoinitiated cure) to a few days. The barrier coating resin formulation may be cured in hours, such as from about one hour to about thirty hours, from about four hours to about twenty hours, or from about six hours to about ten hours. By increasing the cure temperature, a shorter amount of time may be needed to cure the barrier coating resin formulation. Conversely, by decreasing the cure temperature, a longer amount of time may be needed to cure the barrier coating resin formulation. The curing may be conducted using conventional processing equipment, which is not described in detail herein.

During curing, the polycarbosilane preceramic polymer and organically modified silicon dioxide preceramic polymer in the barrier coating resin formulation react (e.g., crosslink), forming a hardened material. Without being bound by any theory, it is believe that during the cure, the barrier coating resin formulation is converted into an amorphous silicon-oxy-carbide material having the filler dispersed therein. The barrier coating, therefore, includes a reaction product of the polycarbosilane preceramic polymer and the organically modified silicon dioxide preceramic polymer, with the filler dispersed therein. By way of example only, the vinyl groups of the barrier coating resin formulation react with silicon-hydrogen bonds during the cure act. The curing may be conducted in a low oxygen environment (e.g., an inert atmosphere environment), such as below 100 ppm of oxygen, to reduce oxidation of the polycarbosilane preceramic polymer and the organically modified silicon dioxide preceramic polymer. If gases are produced from the barrier coating resin formulation during the cure, the cured barrier coating may be porous and the filler may enter pores in the cured barrier coating.

The cured barrier coating of the coated substrate may exhibit sufficient mechanical properties after curing to provide the desired heat, oxidation, and moisture resistance to the coated substrate. The cured barrier coating may prevent oxidation of the underlying substrate. The cured barrier coating may be stable to temperatures of up to 5000° F. (about 2760° C.). The barrier coating (e.g., the cured barrier coating) may provide the coated substrate with resistance to a temperature of up to about 5000° F. (about 2760° C.), such as from about 2000° F. (about 1093° C.) to about 5000° F. (about 2760° C.), from about 2000° F. (about 1093° C.) to about 3000° F. (about 1649° C.), from about 3000° F. (about 1649° C.) to about 4000° F. (about 2204° C.), from about 4000° F. (about 2204° C.) to about 5000° F. (about 2760° C.), from about 2000° F. (about 1093° C.) to about 4000° F. (about 2204° C.), or from about 3000° F. (about 1649° C.) to about 5000° F. (about 2760° C.). The coated substrate may also exhibit reduced mass loss and reduced corrosion.

The cured barrier coating according to embodiments of the disclosure may be configured as a single barrier coating that exhibits the desired resistance properties and mechanical properties in addition to providing sufficient adhesion to the substrate. The cured barrier coating provides the desired resistance properties, mechanical properties, and adhesion properties in a coating having a single chemical composition across a thickness thereof. In other words, the cured barrier coating has a homogeneous composition across its thickness. The cured barrier coating is, therefore, a single composition coating that provides the desired properties along with the desired adherence to the substrate. In comparison, conventional environmental barrier coatings include coatings of different, multiple chemical compositions to provide different functions, such as adhesion, oxygen barrier layer, temperature resistant layer, etc. The conventional environmental barrier coatings include coatings of separate and different compositions to provide the desired overall properties.

The cured barrier coating may then be ceramified to further harden the cured barrier coating and to convert the crosslinked material to a ceramified barrier coating. Thus, the ceramified barrier coating includes a reaction product of the polycarbosilane preceramic polymer and the organically modified silicon dioxide preceramic polymer with the filler dispersed throughout the reaction product. Without being bound by any theory, it is believed that during the cure and ceramification, the barrier coating resin formulation is converted into an amorphous silicon-oxy-carbide material with the filler dispersed therein. The cured barrier coating may be exposed to a temperature of greater than about 649° C. (greater than about 1,200° F.), such as a temperature of greater than about 816° C. (greater than about 1,500° F.) or greater than about 1,093° C. (greater than about 2,000° F.) to ceramify the cured barrier coating. By way of example only, the ceramification temperature may range from about 816° C. to about 1,093° C. or from about 816° C. to about 1,200° C. or greater. The ceramic yield of the ceramified barrier coating may be greater than about 50%, such as greater than about 70%, greater than about 75%, greater than about 80%, greater than about 90%, or greater than about 95% when ceramified at these temperatures. Without being bound by any theory, it is believed that the high degree of quaternary coordinate oxygen in the organically modified silicon dioxide preceramic polymer results in the high ceramic yield. When silicon atoms are fully coordinated with oxygen atoms, $SiO_2$ is maintained during the cure and ceramification. The organically modified silicon dioxide preceramic polymer has sufficient organic groups bonded to the silicon atoms to keep the barrier coating resin formulation in a polymeric state, which enables ease of blending with other materials. It is also believed that at a temperature of about 1,093° C. (about 2,000° F.), the barrier coating resin formulation may be characterized as a semi-amorphous silicon-oxy-carbide material.

The ceramification may be conducted during use and operation (e.g., in situ) of the article including the cured barrier coating. By way of example only, if the article including the cured barrier coating is configured as a rocket motor nozzle, the cured barrier coating may be converted to the ceramified barrier coating during use and operation of the rocket motor nozzle. By ceramifying the cured barrier coating in situ, fewer process acts are conducted to produce the article. Since the barrier coating resin formulation is applied at ambient conditions, the article according to embodiments of the disclosure may also be formed by a lower cost spray process compared to conventional spray processes, such as a plasma spray process. Therefore, the overall cost of the articles formed according to embodiments of the disclosure may be lower than the cost of conventional coated articles formed by plasma spray processes. By conducting the ceramification in situ, the risk of damage to the article is also reduced because the high temperature ceramification is conducted just before use and operation of the article. Forming the article according to embodiments of the disclosure may also be more efficient because less damage occurs to the article.

Alternatively, the ceramification may be conducted before use and operation of the coated substrate. The cured barrier coating may be exposed to a temperature sufficient to ceramify the cured barrier coating, and the coated substrate having the ceramified barrier coating may then be incorporated into or configured as the desired article.

The barrier coating (e.g., the ceramified barrier coating) may provide the coated substrate with resistance to a temperature of up to about 5000° F. (about 2760° C.), such as from about 2000° F. (about 1093° C.) to about 5000° F. (about 2760° C.), from about 2000° F. (about 1093° C.) to about 3000° F. (about 1649° C.), from about 3000° F. (about 1649° C.) to about 4000° F. (about 2204° C.), from about 4000° F. (about 2204° C.) to about 5000° F. (about 2760° C.), from about 2000° F. (about 1093° C.) to about 4000° F. (about 2204° C.), or from about 3000° F. (about 1649° C.) to about 5000° F. (about 2760° C.). For instance, the barrier coating may be used to provide a solid rocket motor with resistance to a temperature of up to about 5000° F. (about 2760° C.). The coated substrate may also exhibit reduced mass loss and reduced corrosion.

Without being bound by any theory, it is believed that the high degree of quaternary coordinate oxygen in the organically modified silicon dioxide preceramic polymer results in the high ceramic yield. When silicon atoms are fully coordinated with oxygen atoms, $SiO_2$ is maintained during the cure and ceramification. The organically modified silicon dioxide preceramic polymer has sufficient organic groups bonded to the silicon atoms to keep the preceramic resin formulation in a polymeric state, which enables ease of blending with other materials. It is also believed that at a temperature of about 1,093° C. (about 2,000° F.), the preceramic resin formulation may be characterized as a semi-amorphous silicon-oxy-carbide material.

With its resistance to high temperature, moisture, and oxidation, the barrier coating may be used in a variety of cost sensitive, high temperature applications. For instance, the barrier coating on the substrate (e.g., the coated substrate) may be incorporated into articles for use in aerospace, automotive, aviation, or other industries needing temperature, water, and oxidation protection. An article 500 including the barrier coating 505 on the substrate 510 is shown in FIG. 1. The barrier coating 505 may include the cured barrier coating or the ceramified barrier coating. The article 500 according to embodiments of the disclosure may be configured for use in applications having a short functional life, such as less than about 30 minutes, with exposure to high temperatures and high pressure during that time. In some embodiments, the article 500 is configured as a rocket motor nozzle. The article 500 according to other embodiments of the disclosure may be configured for applications having a longer functional life, such as, for example, turbine components having a functional life of greater than about 10,000 hours and needing to withstand thermal cycling with little decrease in mechanical properties.

The article 500 according to embodiments of the disclosure may be used as a structural component of a rocket motor, a hypersonic vehicle, or other aerostructure, which is expected to function for less than about 30 minutes during use and operation. The rocket motor may include a solid rocket motor or a liquid rocket motor. The aerostructure may include, but is not limited to, a turbine, a turbine blade, a turbine housing, a turbine engine vane, an insulating tile, a rotor blade, an insulation blanket, insulation, a compressor blade, a wing component, a fuselage skin, a landing gear, a shroud, an exhaust nozzle, an engine exhaust duct, a nose cone, a re-entry shield, or a heat shield. By way of example only, the article 500 may be used as a structural component of a nozzle of the rocket motor or of a casing of the rocket motor. In addition to being used as an oxidation resistant coating on a rocket motor nozzle or other high temperature aerostructure, the article 500 may be used as a high temperature adhesive, a mortar material for filling cracks or gaps, an insulation, a thermal protection material, or a thermal ablation material. In some embodiments, the article 500 is configured as a rocket motor nozzle. In other embodiments, the article 500 is configured as a turbine component.

Figure 2:
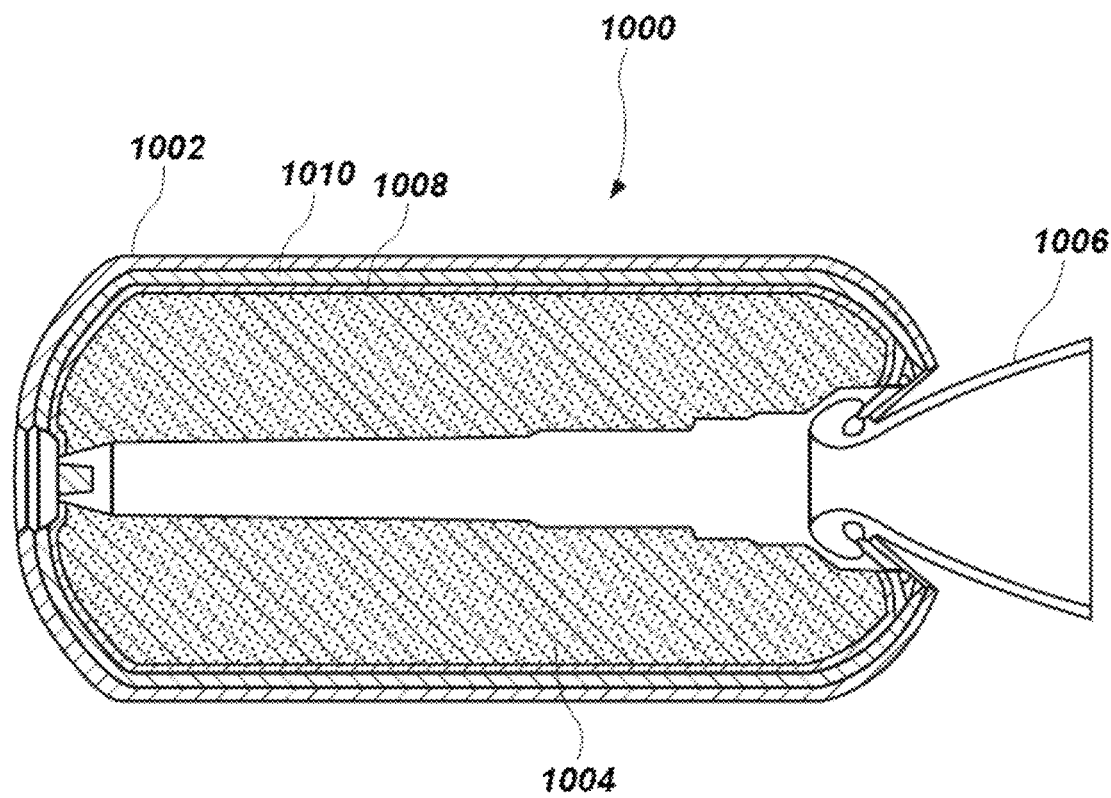
FIG. 2 is a simplified cross-sectional view of a rocket motor including one or more components that include a barrier coating in accordance with embodiments of the disclosure.

FIG. 2 is a simplified cross-sectional view of a rocket motor 1000 (e.g., a solid rocket motor, a liquid rocket motor), in accordance with embodiments of the disclosure. The rocket motor 1000 may, for example, be configured to be a component (e.g., stage) of a larger assembly (e.g., a multi-stage rocket motor assembly). As shown in FIG. 2, the rocket motor 1000 includes a casing 1002, a propellant structure 1004 disposed within the casing 1002, and a nozzle assembly 1006 connected to an aft end of the casing 1002. The rocket motor 1000 may also include one or more of a liner structure 1008 and an insulation structure 1010 between the propellant structure 1004 and the casing 1002. For example, the liner structure 1008 may be located on or over the propellant structure 1004, and the insulation structure 1010 may be located on and between the liner structure 1008 and an inner surface of the casing 1002. The components of the rocket motor 1000 may be formed using conventional processes and equipment, which are not described in detail herein. The article 500 according to embodiments of the disclosure may be incorporated in (e.g., incorporated as) one or more components of the rocket motor 1000. By way of example only, the article 500 may be configured as at least a portion of the nozzle assembly 1006 or the casing 1002. For instance, the barrier coating may be used to provide a solid rocket motor with resistance to a temperature of up to about 5000° F. (about 2760° C.).

While embodiments described herein refer to preceramic precursors of silicon carbide and silicon dioxide, the preceramic precursor of silicon dioxide may also be used with preceramic precursors of other ceramics, such as preceramic precursors of silicon carbide, preceramic precursors of silicon nitride, preceramic precursors of silicon hexaboride, preceramic precursors of aluminum nitride, preceramic precursors of boron nitride, preceramic precursors of boron carbide, preceramic precursors of titanium boride, preceramic precursors of titanium carbide, and preceramic precursors of hafnium carbide.

The following examples serve to explain embodiments of the disclosure in more detail. These examples are not to be construed as being exhaustive or exclusive as to the scope of this disclosure.

EXAMPLES

Example 1

Barrier Coating Resin Formulation 1

A barrier coating resin formulation including 15.97 mass percent of a polycarbosilane preceramic polymer, 3.99 mass percent of an organically modified silicon dioxide preceramic polymer, 65.07 mass percent zirconium dioxide, 14.97 mass percent of titanium diboride, and 0.40 mass percent of a platinum catalyst was prepared. The polycarbosilane preceramic polymer was commercially available from EEMS, LLC as CSO-110. The organically modified silicon dioxide preceramic polymer was commercially available from Gelest, Inc. as VQM-146. The zirconium dioxide had an average mean diameter of 0.6 μm and was commercially available from Panadyne Inc. (Montgomeryville, Pa.) as HCTF. The titanium diboride had an average mean diameter of 3 μm and was commercially available from Momentive Performance Materials Inc. (Waterford, N.Y.) as PGZ-06. The platinum catalyst was commercially available from EEMS as CLC-PL005. The polycarbosilane preceramic polymer, organically modified silicon dioxide preceramic polymer, zirconium dioxide, titanium diboride, and platinum catalyst were combined with mixing and diluted with toluene to produce the barrier coating resin formulation as a solution that was 10% by weight solids. The barrier coating resin formulation is referred to herein as Formulation HTR48 and was a $ZrO_2/TiB_2/SiOC$ coating.

Example 2

Barrier Coating Resin Formulation 2

A barrier coating resin formulation including 15.97 mass percent of a polycarbosilane preceramic polymer, 3.99 mass percent of an organically modified silicon dioxide preceramic polymer, 65.07 mass percent zirconia, 14.97 mass percent of silicon carbide, and 0.40 mass percent of a platinum catalyst was prepared. The polycarbosilane preceramic polymer was commercially available from EEMS, LLC as CSO-110. The organically modified silicon dioxide preceramic polymer was commercially available from Gelest, Inc. as VQM-146. The zirconium dioxide had an average mean diameter of 0.6 μm and was commercially available from Panadyne Inc. (Montgomeryville, Pa.) as HCTF. The silicon carbide had an average mean diameter of 0.5 μm and was commercially available from Panadyne Inc. (Montgomeryville, Pa.) as Green SiC. The platinum catalyst was commercially available from EEMS as CLC-PL005. The polycarbosilane preceramic polymer, organically modified silicon dioxide preceramic polymer, zirconia, silicon carbide, and platinum catalyst were combined with mixing and diluted with toluene to produce the barrier coating resin formulation as a 10% by weight solids coating solution. The barrier coating resin formulation is referred to herein as Formulation HTR49 and was a $ZrO_2/SiC/SiOC$ formulation.

Example 3

Barrier Coating Resin Formulation 3

A barrier coating resin formulation including 34.0 mass percent of the organically modified silicon dioxide preceramic polymer, 0.9 mass percent of a crosslinking agent (HQM-105 from Gelest), 65.0 mass percent of silicon carbide, and 0.1 mass percent of a platinum catalyst was produced. The organically modified silicon dioxide preceramic polymer was commercially available from Gelest, Inc. as VQM-146. The silicon carbide had an average mean diameter of 0.5 μm and was commercially available from Panadyne Inc. (Montgomeryville, Pa.) as Green SiC. The platinum catalyst was commercially available from EEMS as CLC-PL005. The organically modified silicon dioxide preceramic polymer, silicon carbide, crosslinking agent, and platinum catalyst were combined with mixing and diluted with toluene to produce the barrier coating resin formulation as a solution that was 10% by weight solids. The barrier coating resin formulation is referred to herein as Formulation RC12 and was a SiC/SiOC formulation.

Example 4

Coating Process

The formulations in Examples 1, 2, and 3 were applied to carbon substrates by HVLP spray coating processes to determine their respective effectiveness as a barrier coating. One of the substrates was a carbon-carbon panel of a carbon filled phenolic with low fired stretch broken and spun carbon commercially available from Barrday Advanced Material Solutions (Ontario, Canada) as LR1406 and had a laminate thickness of 0.25 inch (6350 µm). The substrate is referred to herein as "LR1406." The other substrate was a chopped carbon-carbon panel that is a low cost carbon substrate having a thickness of 0.125 inch (3175 µm) and a density of 1.7 g/ml and was commercially available from CeraMaterials (Port Jervis, N.Y.) as PC70. The substrate is referred to herein as "Commercial."

The formulations in Examples 1, 2, and 3 were sprayed onto the substrates at room temperature and atmospheric pressure. The substrates were placed a distance of 10-12 inches away from the spray apparatus. The spray apparatus was a conventional HVLP spray gun. The formulations in Examples 1, 2, and 3 were added to a reservoir of the spray apparatus and the spray process was conducted at a compressed air pressure of 15 psi, a spray volume of 0.25 to 0.5 turns, and a spray shape of a cone. The substrates were weighed before and after coating to determine the coating thickness. The coating thicknesses ranged between 0.050 inch (about 1270 µm) and 0.100 inch (about 2540 µm) on the substrates. The coated substrates were dried and cured at a temperature of about 121° C. (250° F.) for 4 hours.

Conventional silicon carbide (SiC), SiC/YSZ, or tungsten/YSZ formulations were applied to substrates by atmospheric plasma spray (APS) processes and used as controls.

Example 5

Scorch Testing

The effectiveness of the HTR48 formulation (Example 1) and the RC12 formulation (Example 3) as barrier coatings was evaluated by exposing the coated substrates to a nozzle fire environment and determining the ability of the barrier coatings to protect the substrates from oxidation. Surfaces of the coated substrates was subjected to various surface temperatures using an oxygen-propane torch. The coated substrates were exposed to temperatures typically seen in rocket motor nozzle sections and carbon-carbon panels during use and operation of a rocket motor. The coated substrates were subjected to an over-test condition where the torch fuel included an oxygen:propane ratio of about 2.5:1 and at temperatures of 2200° F. (about 1204° C.) and 3000° F. (about 1649° C.). The torch was placed a distance of 9 inches from the coated substrates for the 2200° F. testing and a distance of 7 inches from the coated substrates for the 3000° F. testing. The carbon-carbon panels were exposed for 600 seconds at 2200° F. or for 300 seconds at 3000° F. The nozzle sections were exposed for 724 seconds at 2200° F. or for 900 seconds at 3000° F. The effectiveness of the coated substrates against oxidation was determined by mass loss and visual inspection.

Mass loss to the coated substrates was calculated by comparing the initial mass to the percent mass post test. Surface damage to the coated substrates was determined by visual inspection. The barrier coating resin formulations of Examples 1 and 3 were compared to the SiC, SiC/YSZ, or tungsten/YSZ formulations applied by APS. The mass loss and visual results are shown in Table 1, with spalling and/or melting visual results only reported when observed:

TABLE 1

Mass Loss and Visual Inspection of Coated Substrates.

| C-C Substrate | Coating | Surface Temp (° F.) | Coating Thickness (inches) | Heat Flux Start/End (BTU/ft2-sec) | Mass Loss (%) | Visual |
|---|---|---|---|---|---|---|
| Commercial | None | 2200 | NA | | 12.41 | |
| Commercial | None | 2200 | NA | | 15.62 | |
| LR1406 | None | 2200 | NA | | 5.79 | |
| LR1406 | None | 2200 | NA | | 5.84 | |
| Commercial | SiC | 2200 | Not measured | | 4.33 | |
| Commercial | SiC | 2200 | Not measured | | 4.56 | |
| Commercial | SiC/YSZ | 2200 | Not measured | —/46.6 | 5.05 | |
| Commercial | SiC/YSZ | 2200 | Not measured | | 4.75 | |
| Commercial | W/YSZ (40 passes) | 2200 | Not measured | 56.8/60.2 | 1.46 | Oxidation of W and YSZ spalling |
| Commercial | W/YSZ (20 passes) | 2200 | Not measured | 28.4/32.6 | 1.13 | Oxidation of W and YSZ spalling |
| Commercial | RC12 | 2200 | 0.056 | 24.7/67.2 | 7.70 | |
| Commercial | RC12 | 2200 | 0.062 | 72.2/61.7 | 9.44 | |
| Commercial | HTR48 | 2200 | 0.076 | 50.4/61 | 5.83 | |
| Commercial | HTR48 | 2200 | 0.085 | 57.2/60.1 | 7.38 | |
| LR1406 | HTR48 | 2200 | 0.109 | 60.9/58.4 | 3.59 | |
| LR1406 | None | 3000 | NA | 86.9/92.2 | 17.22 | |
| Commercial | SiC | 3000 | Not measured | — | 8.78 | Melting and spalling visible |
| Commercial | SiC/YSZ | 3000 | Not measured | —/79.7 | 7.13 | Spalling visible |
| LR1406 | HTR48 | 3000 | 0.149 | 28.7/100.2 | 2.38 | |

As shown in Table 1, the substrates having the HTR48 coating exhibited the lowest mass loss at both 2200° F. and 3000° F. The low mass loss with the HTR48 coating indicated that a minimal amount of the substrate was consumed (e.g., combusted) and that the barrier coating protected the substrate. In the 2200° F. testing environment, the HTR48 coating performed better than the SiC and SiC/YSZ conventional coatings applied by APS. In the 3000° F. testing environment, the HTR48 coating performed better than the SiC/YSZ conventional coating applied by APS. The W/YSZ conventional coating applied by APS and subjected to 2000° F. was damaged due to spalling or melting. The SiC and SiC/YSZ conventional coatings applied by APS and subjected to 3000° F. were damaged due to spalling or melting. The damage observed with the conventional coatings indicated a risk of premature failure during firing in a nozzle environment.

Example 6

Erosion Testing

Figure 3A:
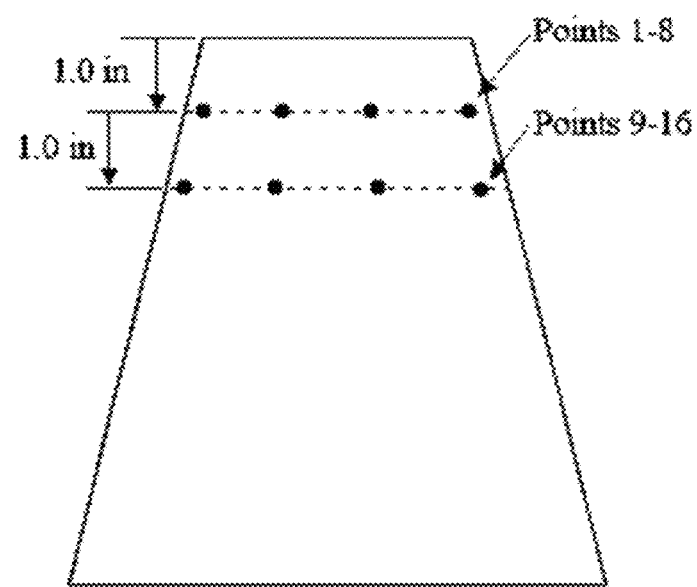
FIGS. 3A-3C illustrate erosion testing and results for a coated nozzle extension in accordance with embodiments of the disclosure.
Figure 3B:
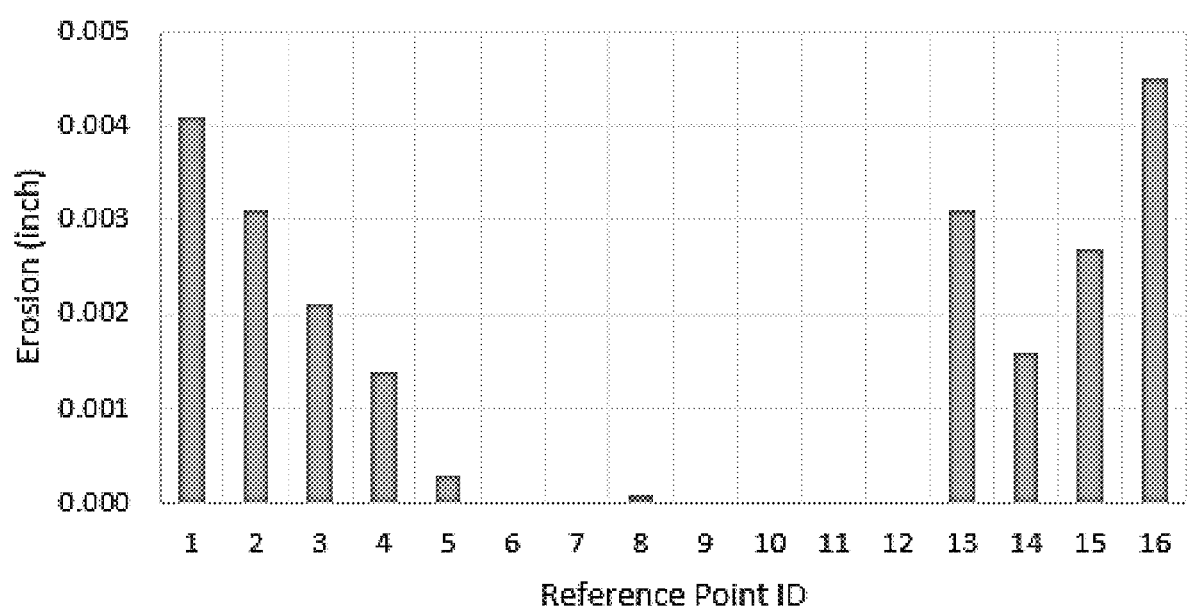
Figure 3C:
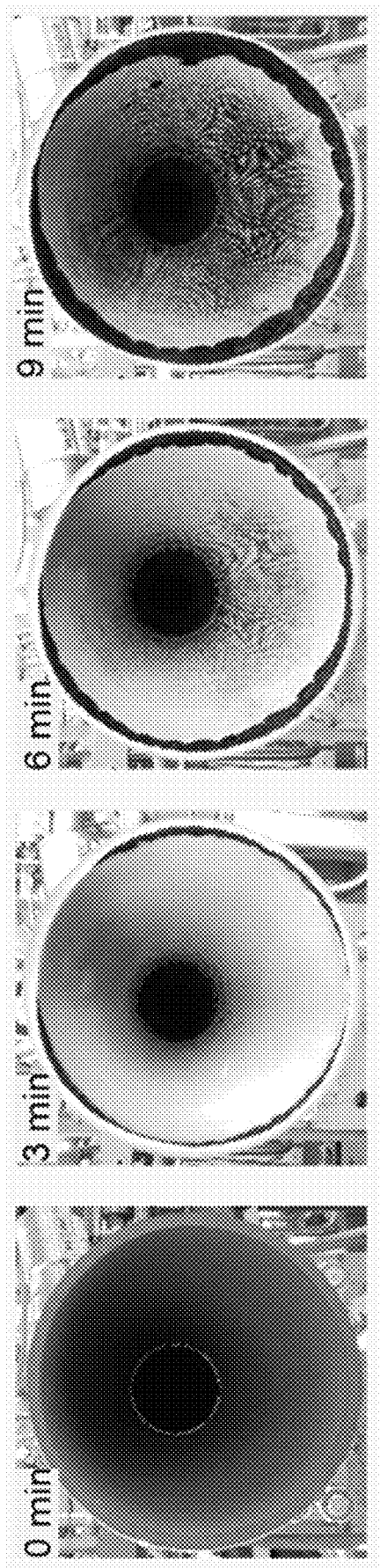

The HTR49 formulation (Example 2) was applied by an HVLP spray coating process to a liquid rocket engine carbon-carbon nozzle extension. The liquid rocket engine carbon-carbon nozzle extension was coated with 2.7 g of the HTR49 formulation and cured at a temperature of about 121° C. (250° F.) for 4 hours. The liquid rocket engine carbon-carbon nozzle extension was tested for 9 minutes at 2300° F. Nozzle erosion was tested at different locations within the nozzle extension, which locations are shown in FIG. 3A. The nozzle erosion at each location was measured and is shown in FIG. 3B. Photographs of the nozzle extension at different times during the erosion testing are shown in FIG. 3C. The HTR49 formulation applied to the liquid rocket engine carbon-carbon nozzle extension prevented oxidation of the carbon-carbon substrate during operation of the liquid rocket engine and erosion was observed to be below 0.005 inch during the testing.

While the disclosure is susceptible to various modifications and alternative forms, specific embodiments have been shown by way of example in the drawings and have been described in detail herein. However, the disclosure is not intended to be limited to the particular forms disclosed. Rather, the disclosure encompasses all modifications, equivalents, and alternatives falling within the scope of the disclosure as defined by the following appended claims and their legal equivalents.

What is claimed is:

1. A barrier coating resin formulation comprising, before cure:
   at least one polycarbosilane preceramic polymer;
   at least one organically modified silicon dioxide preceramic polymer comprising monomers having the chemical structure of:

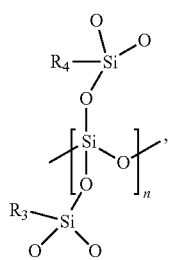

wherein each of $R_3$ and $R_4$ is independently a methyl group, a vinyl group, or a vinyl group bonded to the silicon atom by a linker, and n is an integer from 2 to 10,000;
   at least one filler; and
   at least one solvent.

2. The barrier coating resin formulation of claim 1, wherein the at least one solvent comprises an aprotic organic solvent selected from the group consisting of acetone, acetonitrile (MeCN), benzene, dichloromethane (DCM), dimethylformamide (DMF), dimethylsulfoxide (DMSO), ethyl acetate (EtOAc), hexamethylphosphoramide (HMPA), methyl ethyl ketone (MEK), tetrahydrofuran (THF), toluene, xylene, and combinations thereof.

3. The barrier coating resin formulation of claim 2, further comprising at least one of methanol, ethanol, or propanol.

4. The barrier coating resin formulation of claim 1, wherein the barrier coating resin formulation exhibits a viscosity of between about 50 cP and about 500 cP at a temperature of about 25° C.

5. The barrier coating resin formulation of claim 1, wherein the barrier coating resin formulation exhibits a viscosity of less than or equal to about 100 cP at a temperature of about 25° C.

6. The barrier coating resin formulation of claim 1, wherein the barrier coating resin formulation exhibits a viscosity of less than or equal to about 20,000 cP at a temperature of about 25° C.

7. The barrier coating resin formulation of claim 1, wherein the at least one polycarbosilane preceramic polymer comprises monomers having the chemical structure of:

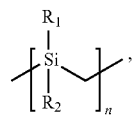

wherein $R_1$ and $R_2$ of each monomer is independently a hydrogen (H) group, a methyl ($CH_3$) group, a vinyl group ($CH_2$=CH) directly bonded to the silicon atom, or a vinyl group ($CH_2$=CH) bonded to the silicon atom by an alkyl linker, and n is an integer from 2 to 10,000.

8. The barrier coating resin formulation of claim 1, wherein one or more of the monomers comprises the vinyl group or the vinyl group bonded to the silicon atom by the linker as $R_3$ or as $R_4$.

9. The barrier coating resin formulation of claim 1, wherein the barrier coating resin formulation comprises a solids content of from about 5 wt % to about 20 wt %.

10. A method of forming an article, comprising:
   applying a barrier coating resin formulation to a substrate, the barrier coating resin formulation comprising, before cure, at least one polycarbosilane preceramic polymer, at least one organically modified silicon dioxide preceramic polymer, at least one filler, and at least one solvent, the at least one organically modified silicon dioxide preceramic precursor comprising monomers having the chemical structure of:

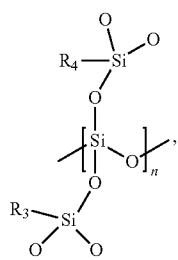

wherein each of $R_3$ and $R_4$ is independently a methyl group, a vinyl group, or a vinyl group bonded to the silicon atom by a linker, and n is an integer from 2 to 10,000; and
curing the barrier coating resin formulation to form a cured barrier coating.

11. The method of claim 10, wherein applying a barrier coating resin formulation to a substrate comprises applying the barrier coating resin formulation to a silicon-based ceramic material, a carbon-based ceramic, a ceramic matrix composite, or a metal material.

12. The method of claim 10, wherein applying a barrier coating resin formulation to a substrate comprises applying the barrier coating resin formulation to a substrate configured as a rocket motor nozzle extension.

13. The method of claim 10, wherein applying a barrier coating resin formulation to a substrate comprises applying the barrier coating resin formulation to a substrate configured as a turbine component.

14. The method of claim 10, wherein applying a barrier coating resin formulation to a substrate comprises spray coating the barrier coating resin formulation on the substrate at a temperature between about 20° C. and about 25° C. and at atmospheric pressure.

15. The method of claim 10, further comprising ceramifying the cured barrier coating to form a ceramified barrier coating.

* * * * *